US006563083B2

(12) United States Patent
Behr et al.

(10) Patent No.: US 6,563,083 B2
(45) Date of Patent: May 13, 2003

(54) LASER ROBOT FOR WORKPIECE MACHINING AND METHOD FOR WORKPIECE MACHINING WITH A LASER ROBOT

(75) Inventors: Friedrich Behr, Aachen (DE); Günter Neumann, Aachen (DE)

(73) Assignee: Thyssen Laser-Technik GmbH, Aachen (DE)

( * ) Notice: Subject to any disclaimer, the term of this patent is extended or adjusted under 35 U.S.C. 154(b) by 7 days.

(21) Appl. No.: 10/024,791

(22) Filed: Dec. 18, 2001

(65) Prior Publication Data
US 2002/0074322 A1 Jun. 20, 2002

(30) Foreign Application Priority Data

Dec. 18, 2000 (DE) .......................................... 100 63 125
Dec. 18, 2000 (DE) .......................................... 200 21 369
Jun. 27, 2001 (DE) .......................................... 101 31 005

(51) Int. Cl.⁷ ........................... B23K 26/02; B23K 26/08
(52) U.S. Cl. ............................. 219/121.78; 219/121.85; 219/121.6
(58) Field of Search ....................... 219/121.78, 121.85, 219/121.76, 121.77, 121.6

(56) References Cited

U.S. PATENT DOCUMENTS 5,233,202 A * 8/1993 Torii et al. ................. 250/561
6,127,647 A * 10/2000 Matsuo et al. ............. 250/561

FOREIGN PATENT DOCUMENTS

EP  0 901 875  3/1999

* cited by examiner

*Primary Examiner*—M. Alexandra Elve
(74) *Attorney, Agent, or Firm*—Gudrun E. Huckett

(57) ABSTRACT

A laser robot for workpiece machining has a first robot link with a robot hand. A first beam path of a first laser beam is arranged on the longitudinal axis of the first robot link and deflected at an end facing a workpiece into an axis-parallel second beam path. A third beam path guides a second laser beam axis-parallel to the first beam path. Focusing optics are arranged in the robot hand. The two laser beams are guided by the focusing optics onto the workpiece. An optical beam combination device is arranged in one of the first and second beam paths for combining the two laser beams acting simultaneously on the workpiece. The two laser beams are guided from the optical beam combination device to the focusing optics simultaneously and axis-parallel or with coinciding axes and from the focusing optics to the workpiece simultaneously axis-parallel or with coinciding axes.

22 Claims, 6 Drawing Sheets

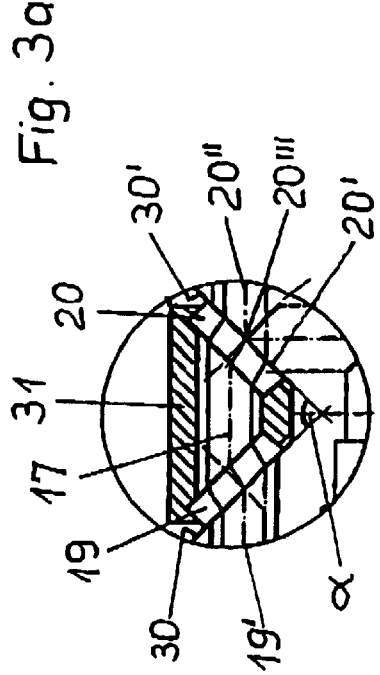
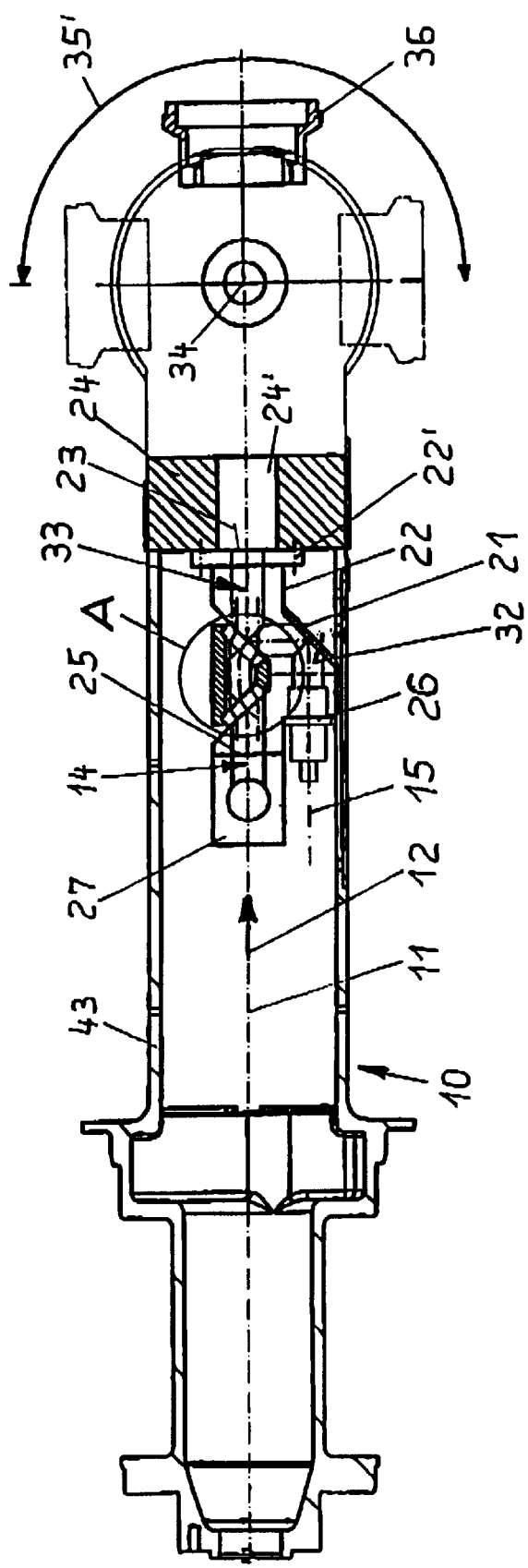
Fig. 3a
Fig. 3

LASER ROBOT FOR WORKPIECE MACHINING AND METHOD FOR WORKPIECE MACHINING WITH A LASER ROBOT

BACKGROUND OF THE INVENTION

1. Field of the Invention

The invention relates to a laser robot for workpiece machining, comprising a first robot link on whose longitudinal axis a first beam path of a first laser beam is to be arranged, which first beam path can be deflected at a side facing the workpiece into an axis-parallel second beam path, and in which a third beam path of a second laser beam is to be arranged axis-parallel to the first beam path of the first laser beam, and comprising focusing optics arranged in a robot hand downstream of the first robot link from where the laser beams reach the workpiece.

2. Description of the Related Art

A laser robot with the aforementioned features is known from EP-A-0 901 875. The first working laser beam of the known robot is guided to an attachment unit which has the task of deflecting the first laser beam from the first beam path into the second beam path which is axis-parallel to the first beam path. In the known laser robot a third beam path of a second working laser beam can be provided, in particular, such that it is to be arranged parallel to the first beam path of the first working laser beam. However, this is possible only when the attachment unit for deflection of the first working laser beam is removed. This is so because the attachment unit projects into the second and also into the third beam path since these two aforementioned beam paths are aligned with one another. Accordingly, when different types of working laser radiation are to be employed, for example, a $CO_2$ laser radiation or a diode laser radiation, a retrofitting of the robot link must be carried out during which the attachment unit is to be either mounted or demounted. This is complex and requires a subsequent adjustment. Moreover, it is not possible to operate the robot simultaneously with two laser beams.

SUMMARY OF THE INVENTION

It is an object of the present invention to further develop a laser robot having the aforementioned features such that the workpiece machining performed with it can be carried out without retrofitting, in particular, when it is to be used for the simultaneous machining with two laser beams.

In accordance with the present invention, this is achieved in that in one of the beam paths of the first laser beam an optical beam combination device of both simultaneously active laser beams is arranged from where both laser beams reach simultaneously axis-parallel or with coinciding axes the focusing optics in the robot hand and in that both laser beams reach the workpiece simultaneously axis-parallel, with coinciding axes, or via an optical beam splitting device which splits laser beams with coinciding axes into axis-parallel laser beams.

It is important in regard to the invention that the workpiece machining action by means of the laser robot can be carried out with simultaneous use of two laser beams. Both laser beams are guided within the interior of the robot and within, in particular, the interior of a robot link as well as a downstream robot hand so that the robot does not require external attachment units and external articulations particularly in the area of the robot hand which otherwise would impede the freedom of movement and the application range of the robot. In this respect, it is advantageous to combine the laser beams in a robot link and to convey them axis-parallel or with coinciding axes into the robot hand, in particular, into the focusing optics. From here, it is then possible to enable the desired application of the laser beams on the workpiece (tool) in that the laser beams are used simultaneously axis-parallel, with coinciding axes, or separate from one another, wherein, if needed, a beam splitting device is employed. By means of the laser robot, it is possible to perform most different machining and measuring tasks, also in combination. It is not required to retrofit the robot in order to be able to work with the two laser beams simultaneously or successively in one working step. Also, the coupling of the lasers to the robot must not be changed.

The laser robot has a particularly advantageous configuration when the second beam path and a fourth beam path, starting at the exit of the beam combination optics and common to both laser beams, are arranged at a certain spacing from the first beam path within a plane defined by the longitudinal axis of the robot link and a pivot axis perpendicular thereto of an additional robot link of the robot hand. As a result of the spacing of the common beam path from the longitudinal axis of the robot link, it is possible to configure the additional robot link in a space-saving way and advantageously such that, primarily with respect to the focusing optics, the common beam path is arranged as much as possible peripherally and the central space is therefore available for inserts, for example, for focusing optics and/or an additional link.

In a further embodiment of the described configuration, it can be advantageous to configure the laser robot such that the additional robot link has a mirror whose axis coincides with the pivot axis of the robot link and with which the two laser beams can be simultaneously guided to the focusing optics which is arranged downstream of the beam splitting device.

The laser robot and, in particular, a robot hand arranged downstream of the first robot link can be expediently configured such that the focusing optics, arranged axially coinciding with the longitudinal axis of the first robot link, is arranged in the additional robot link or in a rotational axis of the additional robot link.

It is preferred to configure the laser robot such that the optical beam splitting device has a splitting element which can be penetrated by the laser radiation of one of the laser beams and which reflects the laser radiation of the other laser beam. For example, by means of the splitting element, the different reflection behavior of certain materials in regard to laser beams of different wavelengths can be taken advantage of. While one laser radiation has a wavelength which passes through the splitting element, i.e., is not reflected, the other laser radiation is reflected because the splitting element is not transmissive for this wavelength.

It is advantageous when the splitting element is a splitting plate which is arranged at an angle to the laser beams. It can be manufactured easily, and products available on the market can be used at least as a starting material for the plates to be employed.

In order to be able to advantageously employ the beam splitting for conventional machining actions, the laser robot is configured such that a deflection plate is optically arranged downstream of the splitting element from where a split laser beam can be guided to the workpiece. The deflection plate can be arranged, for example, such that both laser beams act spaced apart and parallel on the workpiece.

In order to improve the range of application of the laser robot in the afore described sense, it is configured such that the deflection plate has an adjustable spacing relative to the splitting element and/or that the splitting element together with the deflection plate can be rotated about an axis of rotation determined by the focusing optics optically arranged upstream. An adjustment of the spacing between the deflection plate and the splitting element and a common rotation of the splitting element and of the deflection plate can be employed individually and in combination with one another for the purpose of adjusting the laser robot to the task on hand, respectively.

One possible configuration of the laser robot resides in that the optical beam splitting device is arranged optically upstream of the focusing optics which has a focusing lens for one of the beams and a focusing mirror for the other. As a result of this, the focusing of the laser beams can be realized differently in that the focusing lens, on the one hand, and the focusing mirror, on the other hand, are sized differently.

The above described laser robot can be configured such that the focusing mirror is at the same time a deflection part of the beam splitting device. This results in a corresponding simplification of the configuration of the robot. Such a simplification is particularly important when the beam splitting device is arranged in the vicinity of the beam exit of the robot hand because it is desired to provide in this area the most narrow configuration of all components in order to limit the spatial range of use of the robot as little as possible.

The laser robot can be configured such that both laser beams are working laser beams with different radiation parameters. With two working laser beams that are simultaneously active or are cycled in one working step different machining actions can be for performed, for example, a welding process and a cutting process.

The invention relates also to a method for workpiece machining by means of a laser robot, wherein the robot is provided in a first robot link with a first beam path of a first working laser beam of first radiation parameters, and with which a second working laser beam of second radiation parameters, which is axis-parallel to the first beam path, can be employed.

In order to improve this method in the sense of the above-mentioned object, it is performed such that both working laser beams in the robot link are combined axis-parallel or with coinciding axes on a common beam path, and that the combined working laser beams can simultaneously machine in one working step the workpiece at the same machining location or at different, spaced apart machining locations by employing the different radiation parameters. It is of special importance in connection with the method that a broad machining spectrum results because of the simultaneous use of two working laser beams of different radiation parameters. In this connection, the working laser beams can be employed at the same machining location or different, spaced apart machining locations. Different machining geometries and/or different material combinations can be machined in an optimal way. The machining can be carried out at optimized speed.

For certain machining tasks, it is expedient to focus the two working laser beams together. This holds true when the focus of both working laser beams can be identical because the same machining location is to be machined or when different machining locations which, however, have the same spacing relative to the focusing optics, are to be machined.

Preferably, it is possible to operate such that the two working laser beams are split apart in a robot hand arranged downstream of the first robot link. As a result of this, the common beam guidance, which requires only a minimal common cross-section, can be maintained into the robot hand and thus up to the location from where the working laser beams are then emitted onto the workpiece.

A further method is possible in that the spacing of the two working laser beams which are separated from one another can be adjusted corresponding to the required spacing of the machining locations, respectively. When the spacing of the working laser beams is identical to the spacing of the machining locations, a very simple adjustability of the spacing of the machining locations is apparent, in particular, for working laser beams that are parallel to one another, by means of the components of the laser robot which affect the spacing of the working laser beams relative to one another.

When the working laser beams are used with laser radiation of different wavelengths, particularly the beam combination and beam splitting devices can be realized with simple components which have proven successful for the respective wavelengths. Furthermore, each working laser beam can be employed for a special machining process which deviates from the machining process of the other working laser beam, respectively, in correlation with the employed wavelengths, respectively.

For example, it is possible to weld as well as cut temporarily when a working laser beam of a Nd:YAG laser and, at a spacing thereto, at the same time a working laser beam of a $CO_2$ laser are used.

For special machining tasks, a method is suitable in which two working laser beams operate with laser radiation of different wavelength on the same machining location in one working step to perform cutting and welding successively and/or intermeshingly.

BRIEF DESCRIPTION OF THE DRAWING

In the drawing:

FIG. 3 is a simplified side view of the robot link of FIG. 2 with sectioned details;

FIG. 3a is an enlarged detail illustration A of FIG. 3;

DESCRIPTION OF THE PREFERRED EMBODIMENTS

Figure 1:
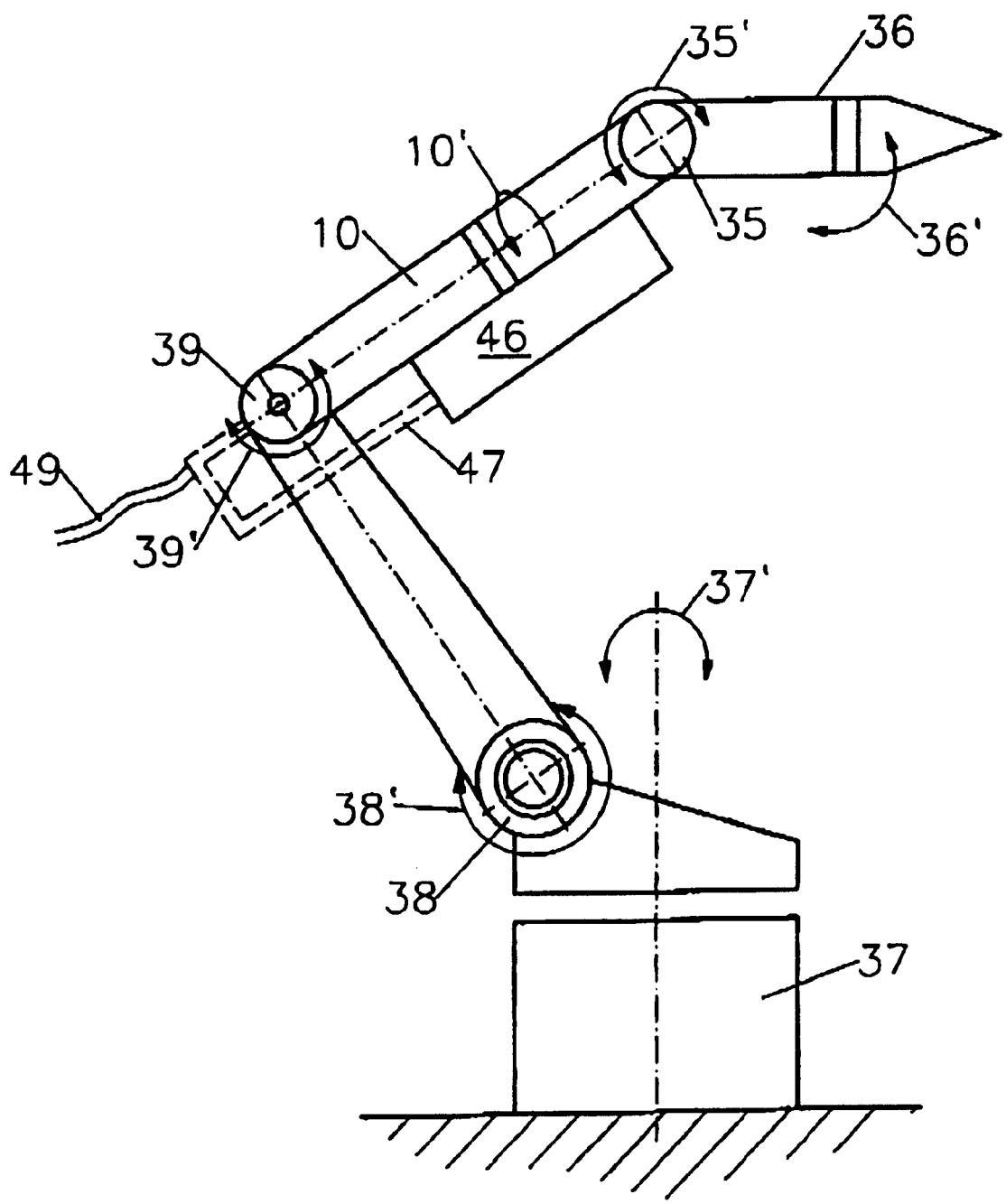
FIG. 1 is a schematic illustration of a buckling arm robot.
Figure 2:
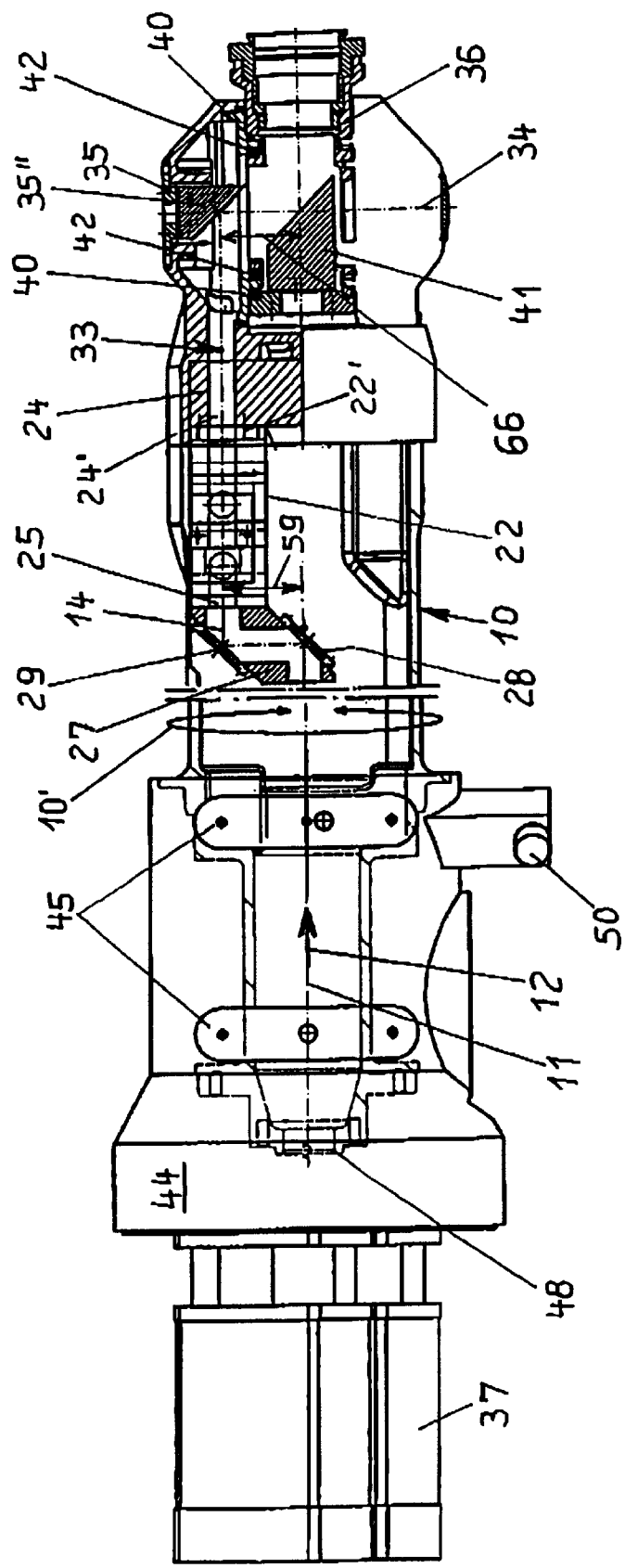
FIG. 2 is a bottom view, partially in a sectioned illustration, of a robot link on which at the side facing the workpiece two additional hand links are arranged.

The buckling arm robot illustrated schematically in FIG. 1 is configured such that it can perform the required movements in all directions of Cartesian coordinates x, y, and z within the limit of the range of its links 37, 38, 39, 10, 35, and 36. All of the aforementioned links are rotational links whose rotational adjustment is realized by motors. FIG. 2 show schematically the arrangement of a drive motor 37 for the robot link 10. The servomotor 37, like the servomotors of the other rotational links, are loaded by a continuous-path control, not explained in detail in this context, such that the desired rotational movement of the links is actuated. The robot is to be used for a three-dimensional machining of workpieces by means of laser radiation, for which purpose a special robot hand is provided which is illustrated in FIGS. 2, 3. This robot arm is comprised substantially of the robot link 10 at the side of the robot and two hand links 35, 36 which are combined with one another constructively. The link 36 is rotatable by means of pivot bearings 40 about its longitudinal axis which is indicated in FIG. 1 by double arrow 36'. In this link 36 the focusing optics 40 are provided with which two working laser beams 13, 16 can be focused onto a workpiece. The hand link 35 can be pivoted about a pivot axis 34 which is formed by a pivot bearing 42. The double arrows 35' in FIGS. 1 and 3 indicate the resulting rotational adjustability of the link 35 of the hand. The link 35 of the hand is otherwise held fixedly by the robot link 10 which has an end face 24 for this attachment at the side of the workpiece.

The robot link 10 is comprised in accordance with FIGS. 2, 3 substantially of a tubular housing 43 which is mounted with its end opposite the end face 24 on the gear box 44 of the motor. The gear box 44 has mounting flanges 45 for a first laser 46 illustrated schematically in FIG. 1. The laser radiation generated by this laser 46 is introduced via a laser radiation feedline 47 and a radiation inlet 48, indicated in FIG. 2, into a first beam path 12 which has a coinciding axis with the longitudinal axis 11 of the robot link 10. Moreover, a non-illustrated second laser is present whose laser radiation is introduced into a third beam path 15 by means of an additional laser radiation feedline 49 which is located within the tubular housing 43 parallel to the first beam path 12. While the first laser 46, for example, is a $CO_2$ laser, the second laser, for example, is an Nd:YAG laser so that the working laser beams 13, 16 generated by the two lasers have correspondingly different wavelengths. The laser 46, for example, has a power of 300 Watt with a beam quality of k=0.7 while the non-illustrated Nd:YAG laser has a power of 200 Watt. The feedline of the laser radiation of the second working laser beam 16 is realized, for example, by means of a flexible line in the form of a glass fiber line connected to a connector element 50 or to the gear box 44.

In order to be able to guide the working laser beams 13, 16 to the workpiece 18 in the desired and space-saving way, they must be combinable in a predetermined way. This combination is realized primarily with the laser beam optics near the end face 24 which is arranged in a housing 22. The housing 22 is fastened on the end face 34 with fastening means 22' and has here a beam exit 23 which opens into a beam passage 24' of the end wall 24. Opposite the beam exit 23, i.e., facing away from the workpiece, the housing 22 supports a beam displacement module 27. This module 27 has a first displacement mirror 28 which is arranged in the first beam path 12 of the first working laser beam 13 so that this working laser beam 13 impinges on the displacement mirror 28 and is deflected vertically to the first beam path 12. As a result of this deflection, the first working laser beam 13 impinges on a second displacement mirror 29 by which the first working laser beam 13 is deflected into a second beam path 14. The first working laser beam 13 reaches the housing 22 along the second beam path 14 up to the point of its beam exit 23.

The third beam path 14 for the second working laser beam 16 is aligned with a second beam entrance 26 of the housing 22. The second working laser beam 16 impinges on a deflection mirror 22 from where it is deflected perpendicularly to the longitudinal axis 11 and impinges on a reflector surface 20' of a reflector plate 20 which reflects the second working laser beam 17 again at a right angle, i.e., into a fourth beam path 33.

In addition to deflecting the second working laser beam 16, the reflector plate serves also for providing a beam passage of the first working laser beam 13. It passes on its way via the second beam path 40 to the beam path 33 common to both laser beams 13, 16 through two optical elements successively arranged in the beam direction, i.e., first a compensation plate 19 and then a reflector plate 20. The compensation plate 19 has refractive properties causing a beam deflection 17. The reflector plate 20 has also refractive properties which cause an opposite beam deflection which is not explained in detail. Both plates 19, 20 are configured and arranged such that the entry symmetry axis 19' of the compensation plate 19 and the exit symmetry axis 20" of the reflector plate 20 are aligned with one another. Accordingly, the beam deflection 17 relative to the beam exit location 20'" of the reflector plate 20 is compensated. Mounting of the compensation plate 19 has the effect that the working laser beam 13 leaving the reflector plate 20 exits precisely at a predetermined beam exit location 20'". This beam exit location 20'" can coincide precisely with the reflection location which is predetermined for the reflection of the working laser beam 16 on the reflector plate 20'. This results in the possibility illustrated in FIG. 4 of employing the working beams 13, 16 coaxially without having to provide special constructive or other adjusting features with respect to the beam deflection 17 in the area of the laser beam optics. Instead, the laser optics can be formed as a modular unit which operates with great precision.

The housing 22 is provided with a mounting cutout 30 illustrated in the plane of illustration of FIG. 3a. This mounting cutout 30 is V-shaped and has an angle α at the tip. This angle is preferably a right angle. An element support 31 which supports both plates 19, 20 can be mounted in this mounting cutout 30. These two plates 19, 20 are also arranged at a right angle so that a mechanically advantageous, i.e., precise, assembly of the element support 31 and the mounting cutout 30 of the housing 22 results. With this assembly it is ensured that the refractive properties of the plates 19, 20 can be compensated as precisely as possible. Further requirements for this are that the plates 19, 20 have the same refractive properties and, for the same material, are especially of the same thickness.

In order for the exit symmetry axis 20" and the center of the second working laser beam 16 impinging on the reflector surface 22 to be identical or to coincide, the deflection mirror 21 must also be precisely arranged. This is achieved in that the deflection mirror 21 is secured on an external housing wall 32 which is parallel to the wall 30' of the mounting cutout 30 facing the workpiece. Both the walls 30', 32 can be produced to be exactly parallel in order to fulfill the precision requirements.

The laser beam optics should be configured to be as loss-free as possible. For example, zinc selenide is provided for the two plates 19, 20. Moreover, by means of coatings it can be achieved that the laser beam optics have as little optical losses as possible. For example, each plate side of the plates 19, 20 can be coated anti-reflectively. This is realized, for example, by means of a dielectric layer which is comprised of two layers with different refractive index, respectively, selected from the group of fluorides $BaF_2$, $MgF_2$, or $YbF_3$. The reflector surface 20 of the reflector plate 20', on the other hand, must be reflective as much as possible for the radiation of the second working laser beam 16, and this can be achieved by a high-reflective coating. Such a coating was achieved with more than five layers of the aforementioned materials so that it was anti-reflective for $CO_2$ laser radiation but highly reflective for the Nd:YAG laser radiation.

The fourth beam path 33 which is common to both working laser beams 13, 16 leads through the end wall 24 to the link 35. A deviation prism 35" is arranged here in the area of the pivot axis 34 at a spacing 66 to a symmetry axis of a focusing mirror 41 rotatable together with the hand link 36 so that the working laser beams 13, 16 are deflected to the focusing mirror 41.

Figure 4:
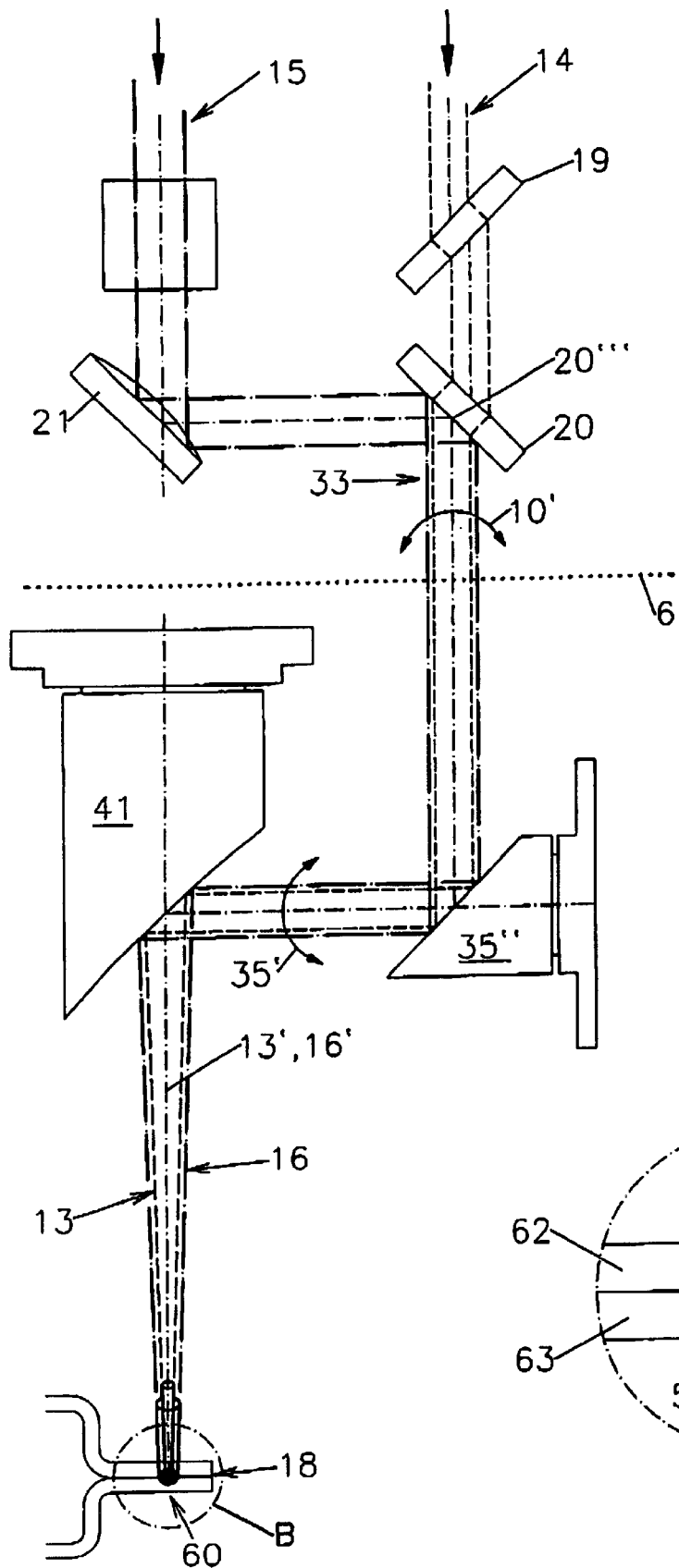
FIG. 4 is a first schematic beam path in a robot link.
Figure 5:
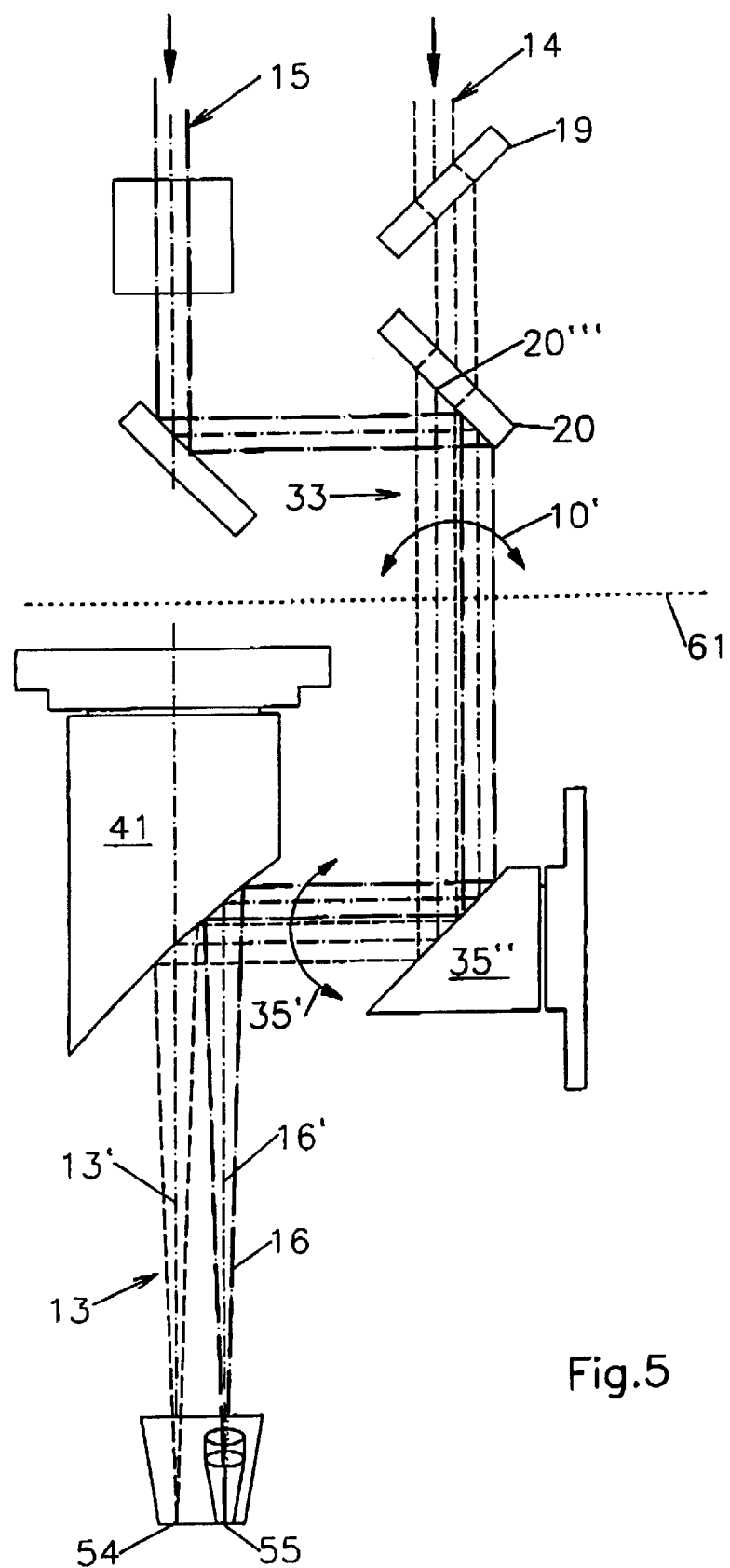
FIG. 5 is a second schematic beam path in a robot link.
Figure 6:
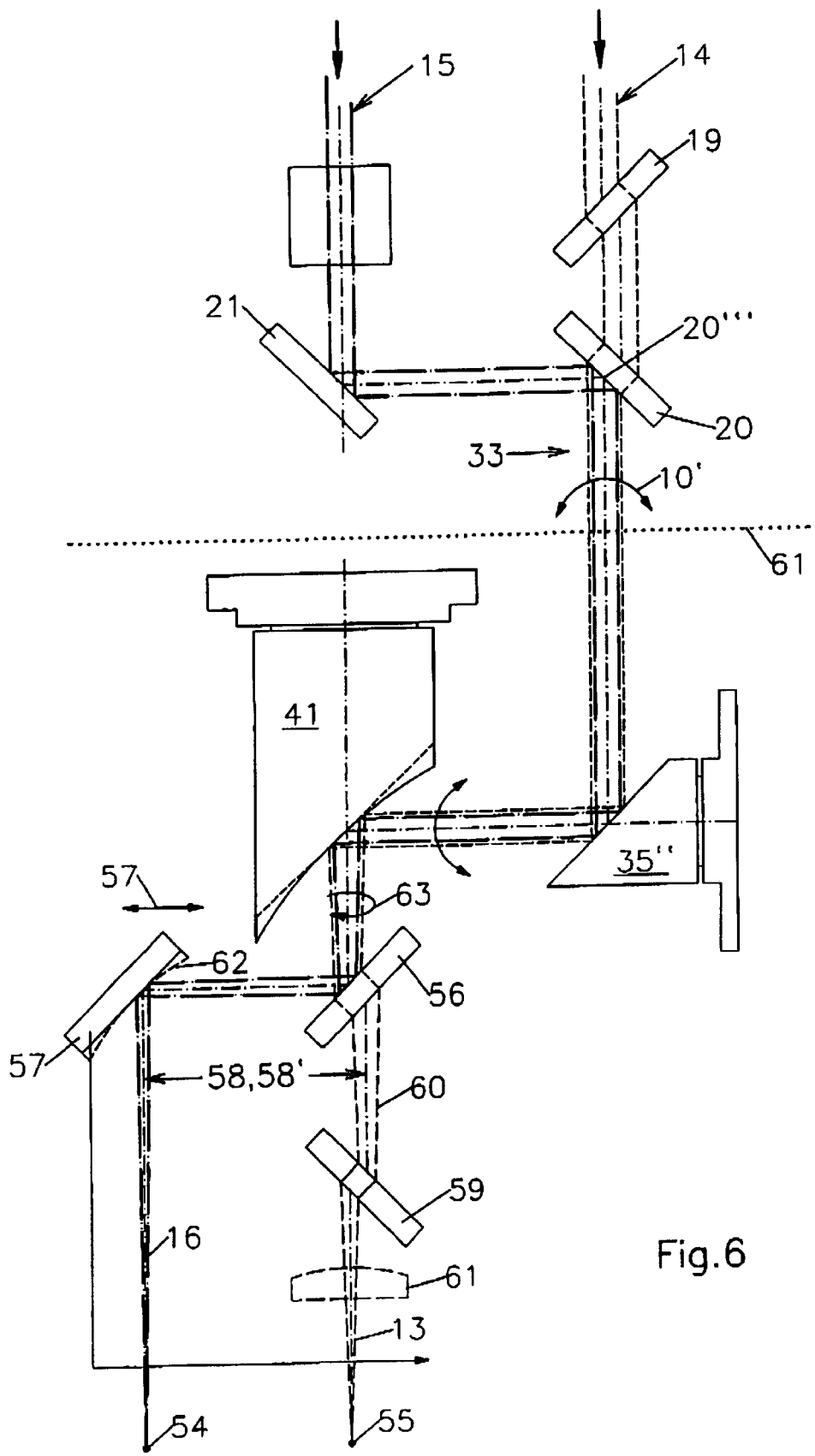
FIG. 6 shows a third schematic beam path of a laser robot with beam splitting device.

FIGS. 4 through 6 show different beam paths which can be configured in different ways by means of the devices or laser robots of FIGS. 1 through 3 with respect to the machining tasks to be solved. Accordingly, they concern the application of laser beams 13, 16 whose radiation has different radiation parameters.

Figure 4A:
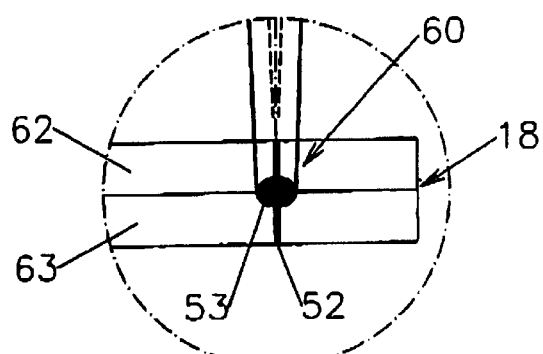
FIG. 4a shows the detail B of FIG. 4.

In all FIGS. 4 to 6 the dotted line 61 indicates that the components illustrated above it are correlated with the robot link 10 while the components illustrated below the line 61 are arranged within the robot hand 35, 36, i.e., are to be correlated either with its link 35 for its link 36. In comparison, it should be noted that the two working laser beams 13, 16 can be combined in the robot link 10 so that they have a common beam path 33. This beam path 33 leads from the robot link 10 into the robot hand 35, 36. The common beam path 33 is adjusted to the configuration of the laser optics of the robot link 10. FIGS. 4 and 6 show that the laser beams 13, 16 are combined with coinciding axes in that the beam exit location 20''' is concentric with the reflection location of the working laser beam 16. In this connection, the base diameter of the laser beams 13, 16 is of no consequence. In FIG. 4, for example, it is illustrated that the working laser beam 16 can be optically widened by means of the deflection mirror 31. In comparison to the laser beam 13 a greater beam diameter results which, according to FIG. 4a, has at the machining location 16 a comparatively greater beam spot and thus results in a welding location 53. On the other hand, the laser beam 13 is greatly focused and thus forms a narrow cutting location 52. This can be achieved particularly when a relatively weakly powered but light-building $CO_2$ sealed laser of high beam quality is used as the laser 46 which is capable of cutting a very narrow gap, while a powerful Nd:YAG laser serves for welding. Something like this can be realized, for example, when the two-layer workpiece 62, 63 illustrated in FIG. 4a comprises a layer 62 of plastic material which does not absorb the wavelength of the Nd:YAG laser so that the energy of Nd:YAG laser is absorbed then by the layer 63 positioned underneath which is, for example, a pigment-containing plastic material layer of a thermoplastic material or of a thermosetting plastic material. The layer 62 could also be made of glass. The power of the lasers can be optimized to achieve a common machining speed.

FIG. 5 shows an axis-parallel combination of the two laser beams 13, 16 by means of an optical beam combination device, i.e., by means of the reflector plate 20. Both beams 13, 16 do not intermesh with one another but reach axis-parallel the focusing mirror 41 in the robot hand 35, 36 by means of the deviation prism 35" which focuses both beams so that the focus of both laser beams 13, 16 is positioned in the area of the machining location 54, 55 on the surface of the workpiece. In this case, it can be achieved, for example, to weld polypropylene with glass fibers by means of the laser beam 16 of the Nd:YAG laser while adjacently cutting is performed by means of the laser beam 13 of the $CO_2$ laser and the workpiece is trimmed in this way.

Machining of workpieces with the working laser beams 13, 16 can be performed simultaneously in one working step. Both beams 13, 16 can thus act simultaneously or alternatingly and successively onto the workpiece. Also a temporal use of one of the laser beams 13 or 16 is possible while the other working laser beam 16 or 13 operates continuously.

In the case of machining with two working laser beams 13, 16, it is also important which spacing the beams have, or should have, from one another. For beam splitting by means of the reflector plate 20 according to FIG. 5, the beam spacing and thus the spacing of the work locations 54, 55 from one another is fixedly determined. Both beams 13, 16 can be used such that by means of a double-wall nitrogen nozzle cutting is performed and, adjacently, welding is performed by means of the Nd:YAG laser radiation. The cutting nozzle can also be in the form of a simple nozzle whose exit for the beam in the upward direction is formed by a ZnSe plate or lens. With this arrangement it was possible to connect by welding the flanges of two polypropylene pipe parts of 1 mm thickness that are pressed against one another and to trim them at the same time.

On the other hand, FIG. 6 shows the possibilities of making the beam spacing 58 adjustable. For this purpose, in principle a beam splitting device is required which is arranged downstream of the focusing mirror 41 but can also be an integral component of the focusing device.

In a first version both working laser beams 13, 16 reach with coinciding axes the focusing mirror 41. The beams 13, 16 focused by it impinge on a splitting element in the form of a splitting plate 56 which is transmissive for $CO_2$ laser radiation but reflects Nd:YAG laser radiation. Accordingly, the $CO_2$ radiation penetrates the splitting plate 56 and reaches the machining location 55 while the reflected Nd:YAG laser radiation impinges on the deflection plate 57, from where it is guided axis-parallel and at the spacing 58 relative to the laser beam 13 to the machining location 54. According to the double arrow 57', the deflection plate 57 can be adjusted so that the spacing 58 can be adjusted correspondingly.

When the $CO_2$ laser radiation passes through the splitting plate 56, a beam displacement 60 results which can be eliminated by means of a compensation element 59 arranged optically downstream of the splitting plate 56. In this regard and with respect to the configuration, manufacture, and arrangement of the components 56, 59, the aforementioned statements in regard to the reflector plate 20 and the compensation plate 19 apply. Materials and coatings can thus be used, if needed, for the optical tasks in the same way.

FIG. 6 shows a combination of the focusing optics and a beam splitting device wherein, corresponding to the dashed line illustration, the component 41 is a planar reflector. The required focusing action is achieved in that the optical beam splitting device according to the dashed line illustration has a focusing mirror 62. Its spacing is adjustable according to the spacing of the deflection plate 57. The working laser beam is focused, on the other hand, by a focusing lens 61 which is arranged downstream of the beam splitting device and particularly of the splitting plate 56.

In FIG. 6 an axis of rotation is indicated at 63. It indicates that the splitting element, i.e., the splitting plate 56, can be rotated together with the corresponding deflection plate 57 so that a corresponding rotation of a line connecting the machining locations 54, 55 is effected. With such an adjustment, which can also be combined in connection with the adjustment of the spacing of the laser beams 13, 16, the machining tasks can be variably performed. For example, the laser beam 13 can serve for welding while the laser beam 16 can at the same time trim an edge of the workpiece. This can be employed, for example, in order to simultaneously weld and trim the edges of metal half shells in a controlled way.

While specific embodiments of the invention have been shown and described in detail to illustrate the inventive principles, it will be understood that the invention may be embodied otherwise without departing from such principles.

What is claimed is:

1. A laser robot for workpiece machining, comprising:
   a first robot link (10) having a longitudinal axis (11);
   a robot hand (35 36) connected to the first robot link (10);
   a first beam path (12) configured to guide a first laser beam (13) and arranged on the longitudinal axis (11) of the first robot link (10), wherein the first beam path (12) is configured to be deflected at an end facing a workpiece (18) into an axis-parallel second beam path (14);
   a third beam path (15) configured to guide a second laser beam (16) and arranged axis-parallel to the first beam path (12) of the first laser beam (13);
   focusing optics arranged in the robot hand (35, 36) downstream of the first robot link (10), wherein the first and second laser beams (13, 16) are guided by the focusing optics onto the workpiece (18);
   an optical beam combination device arranged in one of the first and second beam paths (12 or 14) of the first laser beam (13) for combining the first and second laser beams (13, 16) acting simultaneously on the workpiece (18);
   wherein the first and second laser beams (13, 16) are guided from the optical beam combination device to the focusing optics in the robot hand (35, 36) simultaneously and axis-parallel or with coinciding axes; and
   wherein the first and second laser beams (13, 16) are guided from the focusing optics to the workpiece (18) simultaneously axis-parallel or with coinciding axes.

2. A laser robot according to claim 1, further comprising a fourth beam path (33) starting at an exit of the beam combination device and being common to the first and second laser beams (13, 16), wherein the robot hand (35, 36) has a second robot link (35) having a pivot axis (34) extending perpendicularly to the longitudinal axis (11) of the first robot link (10), wherein the second beam path (14) and the fourth beam path (33) are arranged at a spacing from the first beam path (12) within a plane defined by the longitudinal axis (11) of the first robot link (10) and the pivot axis (34) of the second robot link (35) of the robot hand (35, 36).

3. A laser robot according to claim 2, further comprising an optical beam splitting device configured to split the first and second laser beams (13, 16) having coinciding axes so as to be axis-parallel, wherein the second robot link (35) has a mirror (35") having an axis coinciding with the pivot axis (34) of the second robot link (35), wherein the mirror (35") is configured to guide the first and second laser beams (13, 16) simultaneously to the focusing optics, wherein the beam splitting device is arranged downstream of the focusing optics.

4. A laser robot according to claim 2, wherein the focusing optics, arranged axially coinciding with the longitudinal axis (11) of the first robot axis (10), is arranged within the second robot link (35) or on a rotational axis (36) of the second robot link (35).

5. A laser robot according to claim 1, further comprising an optical beam splitting device which is configured to split the first and second laser beams (13, 16) having coinciding axes so as to be axis-parallel.

6. A laser robot according to claim 5, wherein the optical beam splitting device has a splitting element which is transmissive for the laser radiation of one of the first and second laser beams (13 or 16) and reflects the laser radiation of the other one of the first and second laser beams (16 or 13).

7. A laser robot according to claim 6, wherein the splitting element is a splitting plate (56) arranged at an angle to the first and second laser beams (13, 16).

8. A laser robot according to claim 7, further comprising a deflection plate (57) optically arranged downstream of the splitting element, wherein the deflection plate (57) is configured to guide one of the first and second laser beams (13, 16), having been split by the splitting element, to the workpieces (18).

9. A laser robot according to claim 8, wherein the deflection plate (57) has an adjustable spacing (58) relative to the splitting element.

10. A laser robot according to claim 9, wherein the splitting element is rotatable together with the deflection plate (57) about an axis of rotation (63) determined by the focusing optics arranged optically upstream.

11. A laser robot according to claim 8, wherein the splitting element is rotatable together with the deflection plate (57) about an axis of rotation (63) determined by the focusing optics arranged optically upstream.

12. A laser robot according to claim 6, further comprising a compensation element (59) optically correlated with the splitting element, wherein the compensation element and the splitting element are adjusted relative to one another to obtain compensation of laser radiation displacement (60).

13. A laser robot according to claim 5, wherein the optical beam splitting device is arranged optically upstream of the focusing optics having a focusing lens (61) for one of the first and second laser beams (13 or 16) and a focusing mirror (62) for the other one of the first and second laser beams (16 or 13).

14. A laser robot according to claim 13, wherein the focusing mirror (62) is a deflection part of the beam splitting device.

15. A laser robot according to claim 1, wherein the first and second laser beams (13, 16) are working laser beams with different radiation parameters.

16. A method for workpiece machining with a laser robot, wherein the laser robot has a first beam path (12) of a first working laser beam (13) having first radiation parameters provided in a first robot link (10), wherein a second working laser beam (16) having second radiation parameters is employed axis-parallel to the first beam path (12), the method comprising the steps of:
    combining the first and second working laser beams (13, 16), extending axis-parallel or with coinciding axes relative to one another, in the robot link (10) to combine first and second working laser beams (13, 16) on a common beam path (33); and
    simultaneously carrying out machining work on the workpiece (18) with the combined first and second working laser beams (13, 16) in one working step at the same machining location or at different, spaced apart machining locations (54, 55) by employing the different radiation parameters.

17. A method according to claim 16, further comprising the step of focusing the first and second working laser beams (13, 16) together.

18. A method according to claim 16, further comprising the step of splitting the first and second working laser beams (13, 16) from one another in a robot hand (35, 36) arranged downstream of the first robot link (10).

19. A method according to claim 18, further comprising the step of adjusting a spacing (58') of the first and second working laser beams (13, 16) that are split from one another to a required spacing of the machining locations (54, 55), respectively.

20. A method according to claim 16, further comprising the step of using working laser beams (13, 16) having laser radiation of different wavelength.

21. A method according to claim 16, wherein the first and second laser beams (13, 16) generated by a Nd:YAG laser and a $CO_2$ laser, respectively, are used simultaneously at a spacing (58') to one another.

22. A method according to claim 16, wherein, in the step of simultaneously carrying out machining work on the workpiece (18), the first and second working laser beams (13, 16) with laser radiation of different wavelengths cut and weld at the same machining location (60) in one working step successively, intermeshingly, or successively and intermeshingly.

* * * * *